United States Patent [19]

Day

[11] Patent Number: 4,905,026

[45] Date of Patent: Feb. 27, 1990

[54] GAS-SUPPORTED ELECTROGRAPHIC WRITING HEAD

[75] Inventor: Gene F. Day, Hillsborough, Calif.

[73] Assignee: Precision Image Corporation, Redwood City, Calif.

[21] Appl. No.: 313,166

[22] Filed: Feb. 17, 1989

[51] Int. Cl.[4] .............................................. G01D 15/00

[52] U.S. Cl. ...................................... 346/155; 346/150

[58] Field of Search .............. 346/155, 76 PH, 139 R, 346/150, 153.1; 358/300; 400/119

[56] References Cited

U.S. PATENT DOCUMENTS 4,198,923 4/1980 Blumenthal .......................... 118/660

4,706,605 11/1987 Bibl et al. ............................ 118/631

4,812,860 3/1989 Sheridan et al. .................... 346/155

*Primary Examiner*—Arthur G. Evans

*Attorney, Agent, or Firm*—Thomas Schneck

[57] ABSTRACT

A writing apparatus for forming an electrostatic latent image on a charge-retentive image carrier in which the writing head is biased by a force so that the writing head tends to contact the image carrier, thereby blocking a gas opening operatively associated with the writing head. A stream of pressurized gas is projected from the gas opening and the escaping air provides a counterforce which moves the writing head away from the image carrier until an equilibrium position is reached in which the writing head is preferably spaced apart from the image carrier by a predetermined very small distance. Typically, the image carrier is a sheet of paper supported on a rotatable drum, but the image carrier may be paper drawn from a roll of paper and resiliently biased against the writing head. The latent image is written by a plurality of selectively energized charging elements that terminate at an outlet side of the writing head. The outlet side has first and second bearing surfaces which are spaced apart to define the gas opening.

26 Claims, 3 Drawing Sheets

GAS-SUPPORTED ELECTROGRAPHIC WRITING HEAD

TECHNICAL FIELD

The present invention relates to apparatus for forming an electrographic latent image on an image carrier for printing on charge-retentive media.

BACKGROUND ACT

An electrographic printing and copying, a charge pattern is created on a dielectric surface to form a latent image which is then developed by contact of the latent image with toner which is usually a powder or liquid. The dielectric surface may be a coating on a sheet or web of paper to which the toner is applied. Alternatively, the dielectric surface may be the charge retentive surface of a drum, belt or the like from which toner is transferred onto a sheet or web of paper.

An electrostatic latent image may be established through electrostatic induction by a charged writing head, by ion projection, or through photoconduction. In the cases of ion projection and photoconduction, formation of the latent image is provided by members which are spaced apart from the dielectric surface on which the image is formed. On the other hand, a charged writing head, as described in the U.S. Pat. No. 4,706,605 to Bibl et al., is in direct physical contact with the dielectric surface. This patent features a drum printer and a writing head comprising a linear array of closely spaced charging elements for writing an electrostatic latent image on a sheet mounted on a drum. In comparison, U.S. Pat. No. 4,198,923 to Blumenthal teaches a web of paper which is pressed against a print head. The benefit of a web system is that it is possible to provide a wrap angle around a large radius head so that the tension of the paper provides the contact with the head, much like magnetic tape on a magnetic head. Thus, the pressure is typically low compared to that of drum systems where a head must be pressed against a rotating drum. There are, however, advantages associated with the drum system. Among the chief benefits achieved in the drum printer is the fact that the sheet being printed upon is fully stabilized and accurately positioned by the drum during the printing process. As a result, accuracy and color registration are superior compared to the web system.

Physical contact of the writing head with the special coating of an electrostatic sheet may result in damage being done by the electrostatic sheet to the writing head, or damage done by the writing head to the electrostatic sheet. The problems are minor ones, but are annoying because they can affect print quality. Sometimes the coating of electrostatic paper, vellum, or film, is a relatively abrasive coating which may scratch the writing head and cause image noise. Other coatings may leave a resin deposit on the nibs, i.e. the working end of the charging elements, thereby causing some signal dropout. The writing head may also damage the electrostatic sheet by abrading the surface of the dielectric coating, sometimes causing background staining by the toners.

An object of the present invention is to provide a writing head for electrostatic image formation which significantly reduces the chance of head damage to an image carrier, and significantly reduces the chance of image carrier damage to the writing head.

DISCLOSURE OF THE INVENTION

The above object has been met by a writing head having charging elements maintained by gas pressure in a low mechanical pressure relation with an image carrier, either in light contact or slightly spaced therefrom. The writing head is resiliently biased toward contact with the image carrier, but then back-biased with a stream of pressurized gas. This stream overcomes the resilient biasing to move the writing head into an equilibrium position in a direction away from the image carrier.

The writing head has an outlet side defined by first and second external surfaces on opposite sides of a gas-release opening for gas delivery. While this is the preferred embodiment, other arrangements of the gas-release opening are possible and a writing head having more than one such opening is likewise possible. An array of charging elements are fixed to the writing head and are disposed to provide localized charges on the image carrier. The writing head is biased mechanically to place the first and second external surfaces into a rest position in contact with the image carrier, thereby blocking the gas-release opening. The image carrier may be an electrostatic sheet or web or may be an intermediate surface, such as a drum or web, on which a latent image is first developed for subsequent transfer to a sheet of paper. Where the image carrier is a web, typically the web is partially wrapped around the writing head which is fixed in position so that it is the web which is moved to an equilibrium position by the stream of pressurized gas. Alternatively, the contacting surface of the head may be flat, in which case a resilient backing member behind the web, such as a soft roller or a pad, may be used to urge the web into contact with the head. In any case the pressurized gas moves the web back into an equilibrium position.

A source of pressurized gas is in fluid communication with the writing head for supplying gas, preferably air, through the gas-release opening. The escaping air forces the writing head in a direction away from the image carrier or, in the case of a web, forces the web away from the head. Air passing between the image carrier and the external surfaces of the writing head forms an air barrier to move these structures to an equilibrium position relatively spaced apart compared to the relaxed, rest position. Adjustment of the air pressure sure determines the equilibrium position. The air pressure serves to mechanically separate the writing head and the image carrier. Alternatively, the air pressure may serve to reduce the mechanical pressure of the writing head against the image carrier even though direct contact still exists. In this case some leakage of air still occurs due to the microscopic roughness of the two mating surfaces.

An advantage of the present invention is that the writing head and charging elements are no longer in heavy contact with the image carrier. Therefore, neither the writing head nor the image carrier are damaged by motion of the image carrier relative to the head. Another advantage is that the present invention makes it possible to adjust the atmospheric pressure in the discharge zone between the image carrier and the nibs, or working ends of the charging elements. It is believed that increasing the air pressure in this discharge zone increases image quality. The advantages of the present invention are realized to a substantial degree even when the air pressure is adjusted so that the writing head and image carrier are still in contact, but with less head-to-carrier force than is present in fixed writing head arrangements.

BEST MODE FOR CARRYING OUT THE INVENTION

Figure 1:
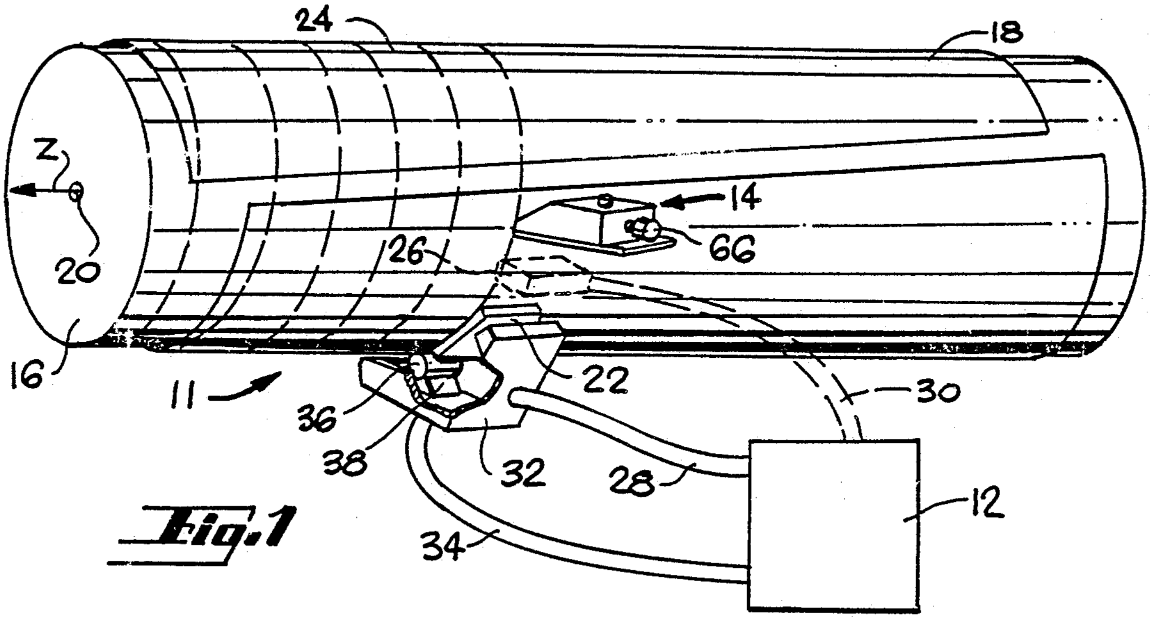
FIG. 1 is a perspective view of an electrostatic printer employing the writing head of the present invention.

With reference to FIG. 1, an electrostatic printer, of the type described in the previously mentioned patent to Bibl et al., having a liquid toner recycling system 12 employs a writing head 14 described below. A drum 16 supports a sheet of paper 18 for rotation, but the writing head 14 may also be used in systems which print an image on a continuous web of paper or other media. In the electrostatic printer 11, an axle 20 located on the longitudinal axis Z through the center of the drum 16 supports the drum and transmits rotational energy from a motor, not shown. The size of the drum 16 may vary, with a large size drum typically having a diameter of approximately 12 inches and a width of approximately 52 inches. The invention is useful for wide printers where an image may be created by scanning a surface, one portion at a time, or for narrow printers where an image is created in a single pass. The present invention is described with reference to a rotary scanning system, but is not limited to this. A sheet of paper 18 is coated with a charge-retentive dielectric medium on which a latent image may be formed and developed. Alternatively, the latent image may be formed and developed directly on a drum or web, and the developed image later transferred onto a sheet or web of plain paper.

A toner applicator 22 follows the writing head 14 and applies liquid toner for developing a latent image existing in a charge pattern deposited by the writing head on the sheet of electrostatic paper 18. The latent image created by the writing head 14 is thus formed into a visible image. The toner applicator 22 may be a toning shoe, as shown, which applies the liquid toner locally to the sheet of paper along a helical pattern 24, indicated by dashed lines, or may alternatively be a full drum width toning fountain or pool applicator. A prewet station 26 located between the writing head 14 and the applicator 22 may be included to wet the latent image prior to toning. The wetting at the prewet station 26 is provided by a clear fluid dispersant, such as the hydrocarbon sold under the tradename Isopar by Exxon Corporation. The prewetting can enhance toning contrast and greatly reduce background marking.

Liquid toner is applied to toner applicator 22 from the toner recycling system 12 through a supply tube 28. Likewise, if desired, clear dispersant may be supplied to the prewet station 26 from the toner recycling system through a second supply tube 30. Excess toner falls into a sump at the bottom of a hood 32 for collection and return through a drain pipe 34 to the liquid toner recycling system 12. A rotatable roller 36 contacts the surface of the sheet of paper 18 for the purpose of drying the paper after development of the latent image. A scraper 38 removes liquid from the rotatable roller 36. In place of the roller 36, a flow of air may be used to dry the sheet of paper 18.

Figure 2:
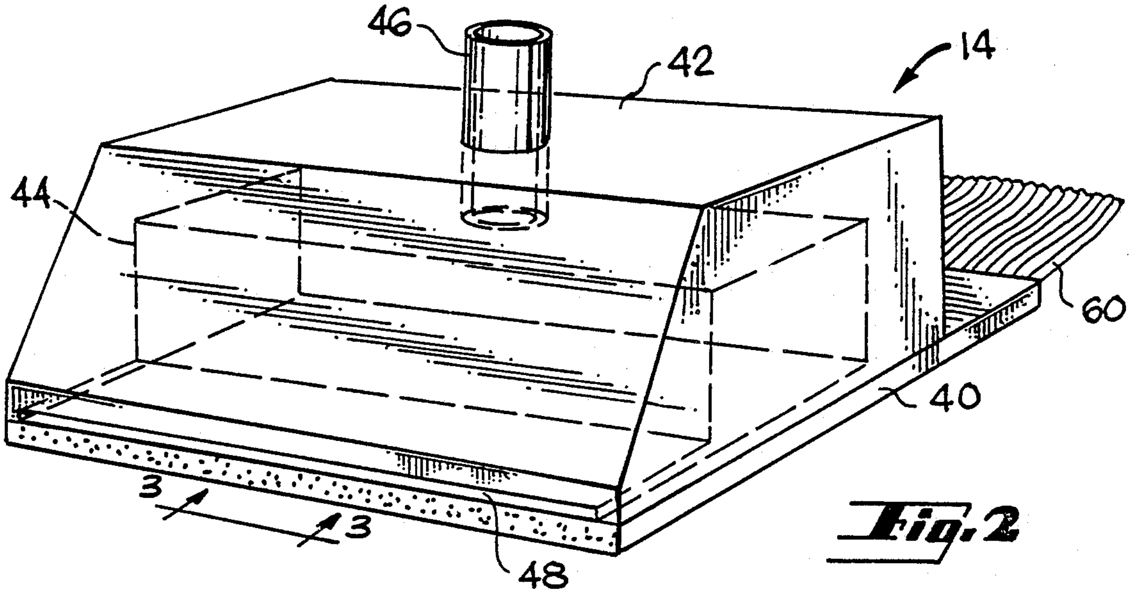
FIG. 2 is a perspective view of the writing head of FIG. 1.
Figure 3:
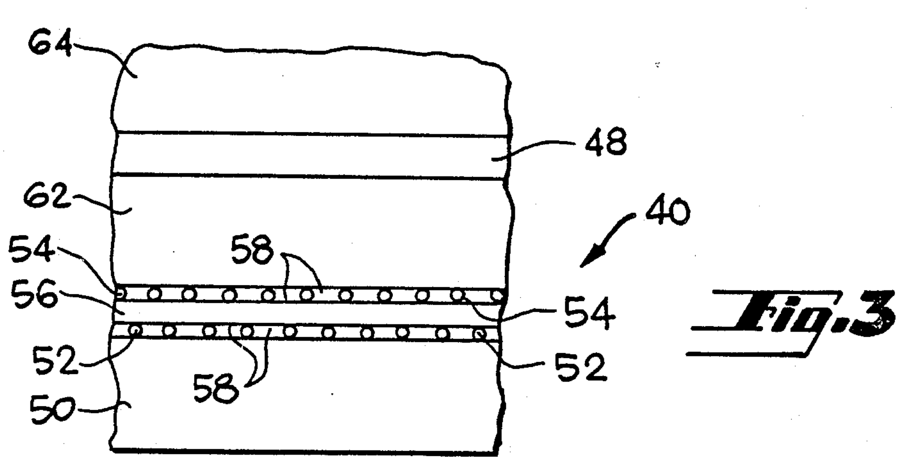
FIG. 3 is a partial front view of the writing head of FIG. 2 taken along lines 3-3.

Referring now to FIGS. 1-3, the writing head 14 for creating an electrostatic latent image includes a retainer member 40 and an air chamber member 42. The air chamber member 42 includes interior walls that define a plenum 44 when the air chamber member is joined to the retainer member 40. The plenum 44 is a completely enclosed volume with the exception of an inlet 46 and a gas-release opening 48 along the outlet side of the writing head 14. Other arrangements of one or more gas-release openings are possible.

The retainer member 40 has a first ceramic region 50 that extend 0.05 inch from the edge of the retainer member to a first row 52 of nibs. The first row 52 of nibs is spaced from a second row 54 of nibs by a 0.011 inch thick ceramic separator 56. Adjacent nibs in a row 52 and 54 of nibs are separated by epoxy 58. The nibs are the working ends of a series of charging elements, or very fine copper wires, that enter the retaining member 40 as a blanket of 1,024 wires 60, each having a diameter of 0.0027 inch. The wires have a center-to-center spacing of 5 mils in each of the two rows. It is possible to use charging elements other than wires, but the wires present a manufacturing advantage. Alternatively, the retainer member 40 may be a printed circuit board having 1,024 copper traces which function as the charging elements. The wires, or charging elements, are disposed in two offset rows 52 and 54 of 512 wires each. The number of total wires in the arrangement of wires is selected because it is convenient for digital processing. A second ceramic region 62 extends from the second row 54 of nibs to the gas-release opening 48. Like the first ceramic region 50, this second region is 0.05 inch in length so that the entirety of the retainer member is approximately 0.117 inch in thickness.

Proper spacing of the charging elements is achieved by winding 0.0027 inch diameter wire about a drum having machining grooves 5 mils apart. The wires may then be epoxied so that they remain in fixed relation after removal from the drum.

The two rows of nibs and the plenum 44 are both 2.56 inches in overall length as is the opening 48. The retainer member 40 and the air chamber member 42 are approximately 2.75 inches in length. The gas-release opening 48 as measured from the retainer member to the air chamber member is 0.01 inches wide, while the planar surface 64 of the air chamber member immediately above the gas-release opening is 0.063 inches wide.

The writing head 14 is translated laterally, parallel to the rotational axis Z or the drum 16. The 1,024 wires of the linear array are biased for writing at a negative potential of 550–600 volts relative to the drum and act as electrostatic charging elements which provide localized charges on the dielectric coating of the sheet of paper 18. The writing head and the toner applicator 22 move together laterally and continuously so that a helical stripe pattern 24, indicated by dashed lines, is traced on the paper 18 by the relative motion of the head and shoe on the one hand and the drum on the other hand.

An electrical control box, not shown, receives a block of digital data consisting of bits to be printed on the sheet of paper 18. The control box divides the block of digital bits to be printed to columns to be sequentially transmitted to the printer one after another so that printing appears to be in the form of helical scanning of the paper, with one column continuously fed after another. A momentary pause in printing may be used in going from one column to the next at the top and bottom of the page where margins may exist or a gap in the wrap of the sheet around the drum. The digital data is transmitted in the flat blanket of wires 60 to the head 14. A source of high voltage applied to the writing head allows the binary bits to be converted to electrical charge deposited onto the sheet of paper 18 by selected nibs in the nib rows 52 and 54 at the writing end of the linear array of wires. The lateral motion of the writing head is smooth and continuous so that when the sheet of paper is wrapped around the drum the columns appear to be in a continuous helical spiral without any spaces or overlap in the spiral pattern. U.S. Pat. No. 4,706,605 to Bibl et al. describes use of a lead screw to provide lateral motion, and is herein incorporated by reference.

Figure 4:
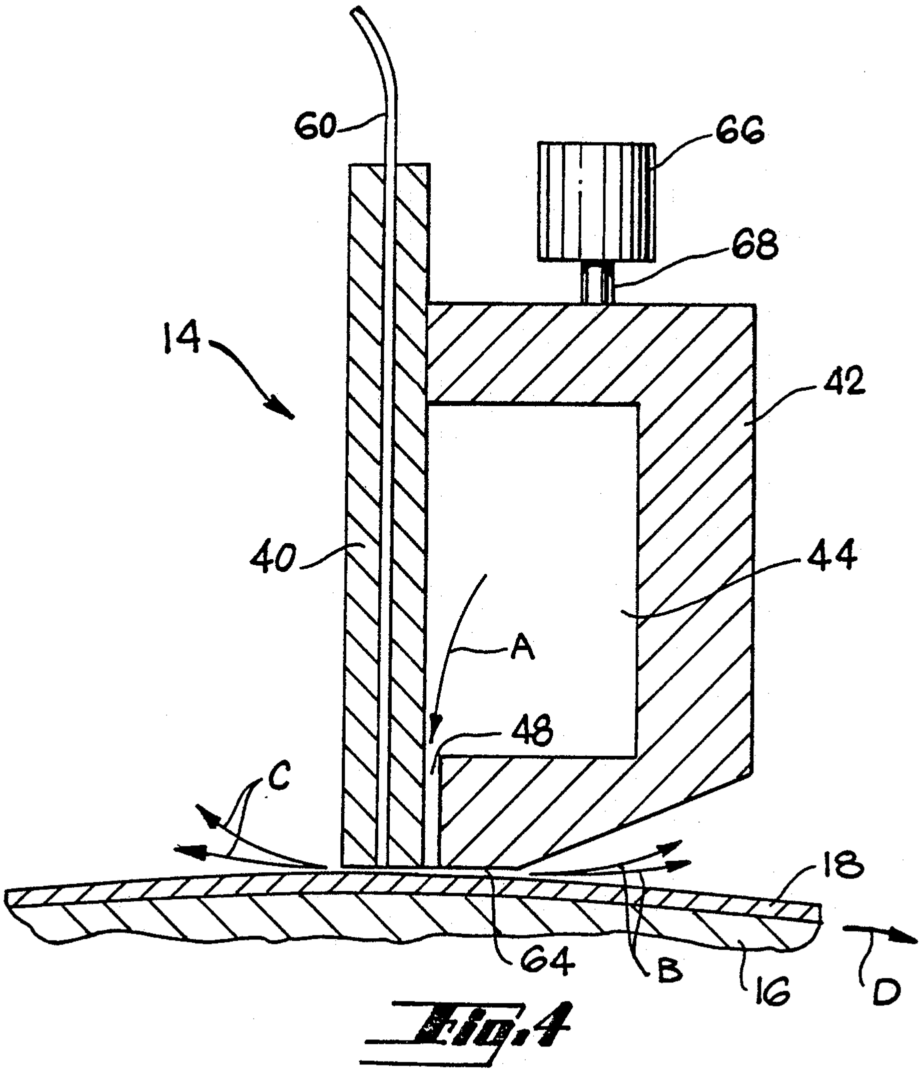
FIG. 4 is a side sectional view of the writing head of the present invention shown adjacent to a sheet of paper supported on a rotatably driven drum.
Figure 5:
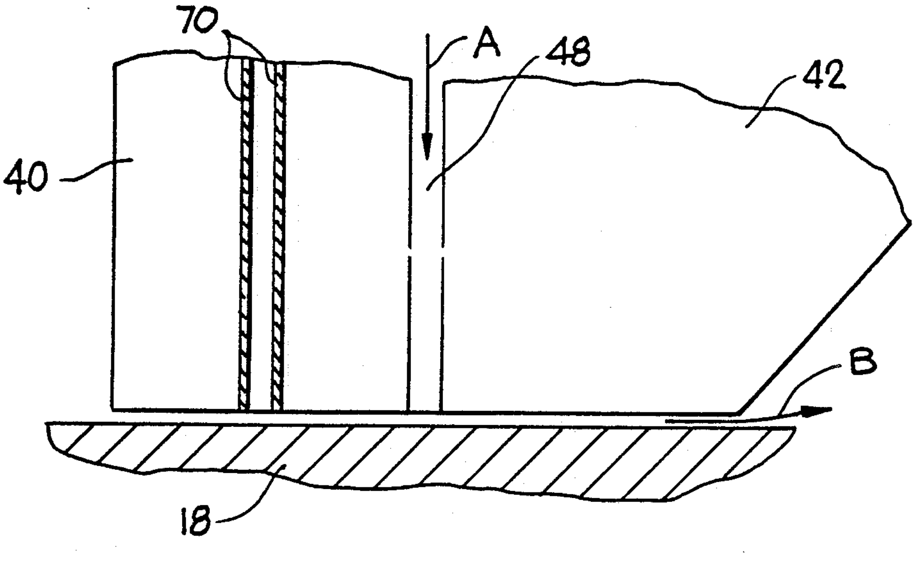
FIG. 5 is an enlarged view of a portion of FIG. 4.

Referring now to FIGS. 4 and 5, the writing head 14 is resiliently biased against the sheet of paper 18 on the drum 16 by a piston 66 or other known mechanical biasing means. The piston 66 remains horizontally stationary relative to the drum 16, but a piston rod 68 urges the writing head in the direction of the sheet of paper 18. The biasing of the piston rod 68 may be provided by a spring housed within the piston, or may be provided hydraulically or with air pressure. Typically, the force is approximately 0.75 pounds.

The piston 66 biases the writing head 14 into a rest position in which the retainer member 40 and the air chamber member 42 both contact the sheet of paper 18, thereby blocking the gas-release opening 48. However, injection of air into the plenum 44 causes a movement away from the sheet of paper. The plenum 44 extends longitudinally along the writing head, as does the gas-release opening 48. The plenum is connected to a source of gas, not shown. This source of gas includes an air filter and supplies a filtered stream of gas, preferably air, to the plenum. Because the gas is compressed, a moisture trap is advantageous to prevent water droplets from being carried by the air stream into the writing area. In this manner, as shown by arrow A, pressurized gas from the plenum is injected into the gas-release opening. The pressurized gas impinges upon the sheet of paper 18 and a portion of the pressurized gas, represented by arrows B, escapes in the direction of paper movement. A second portion, represented by arrows C, escapes in the direction opposite paper movement. The surfaces of the writing head 14 that are adjacent the sheet of paper 18 act as air bearings as the force of escaping gas moves the writing head away from the sheet of paper. The writing head moves until an equilibrium position is reached in which the force provided by the piston 66 is equaled by the force provided by escaping air. Typically, the equilibrium position is from a light contact position up to 20 microns away from the relaxed rest position, with 1-4 microns being preferred.

The gas-release opening 48 may be either upstream or downstream of the charging elements 70 which create the latent image on the paper 18, relative to paper movement. The gas-release opening is shown in a downstream position in FIGS. 4 and 5, but in an upstream position in FIG. 1. The linear gas-release opening 48 is the preferred embodiment for reasons of manufacturing convenience. Moreover, it has been discovered that elevated air pressure in the discharge zone between the paper 18 and the charging elements 70 improves image quality, and the linear opening provides a relatively uniform elevation in air pressure across the array of charging elements. Other embodiments, however, are possible. For example, an array of round or square gas-release openings spaced along the length of the writing head, or an outrigger-type structure may be fixed from the writing head. Generally, if gas is forced to pass between the paper, or other image surface, and an opposing surface such as the working surface of a writing head, the two surfaces will be supported in spaced relation.

The sheet of paper 18 is maintained in a flattened condition against the drum 16 by vacuum, but the inherent roughness of the paper causes surface variations of 5 to 10 microns. It is not critical that the writing head be moved to an equilibrium position in which the writing head makes no physical contact with the sheet of paper. While such a position is preferred, it is sufficient for substantial achievement of the advantages of the present invention if the writing head is displaced by the escaping air so that there is less head-to-paper pressure than is necessary in a fixed head arrangement.

In operation, the drum 16 and the supported sheet of paper 18 are rotated relative to the writing head 14, as indicated by an arrow D of FIG. 4. Pressurized gas from the plenum 44 is projected into the gas-release opening 48 and escapes from between the sheet of paper and the surfaces of both the retainer member 40 and the air chamber member 42. The escape of pressurized air overcomes the force of the piston 66 to move the writing head into an equilibrium position in a direction away from the sheet of paper. The charging elements 70 selectively provide localized charges to form a grid-like latent image. Each position is an image pixel which is either dark or light depending upon whether charge was deposited in that position. The charging elements 70 are copper wires, but this is not critical. The writing head moves laterally under control of a screw or linear motor, creating an image across an entire sheet. FIG. 1 shows a helical stripe scanning pattern, but other patterns, such as a raster pattern could be used.

Figure 6:
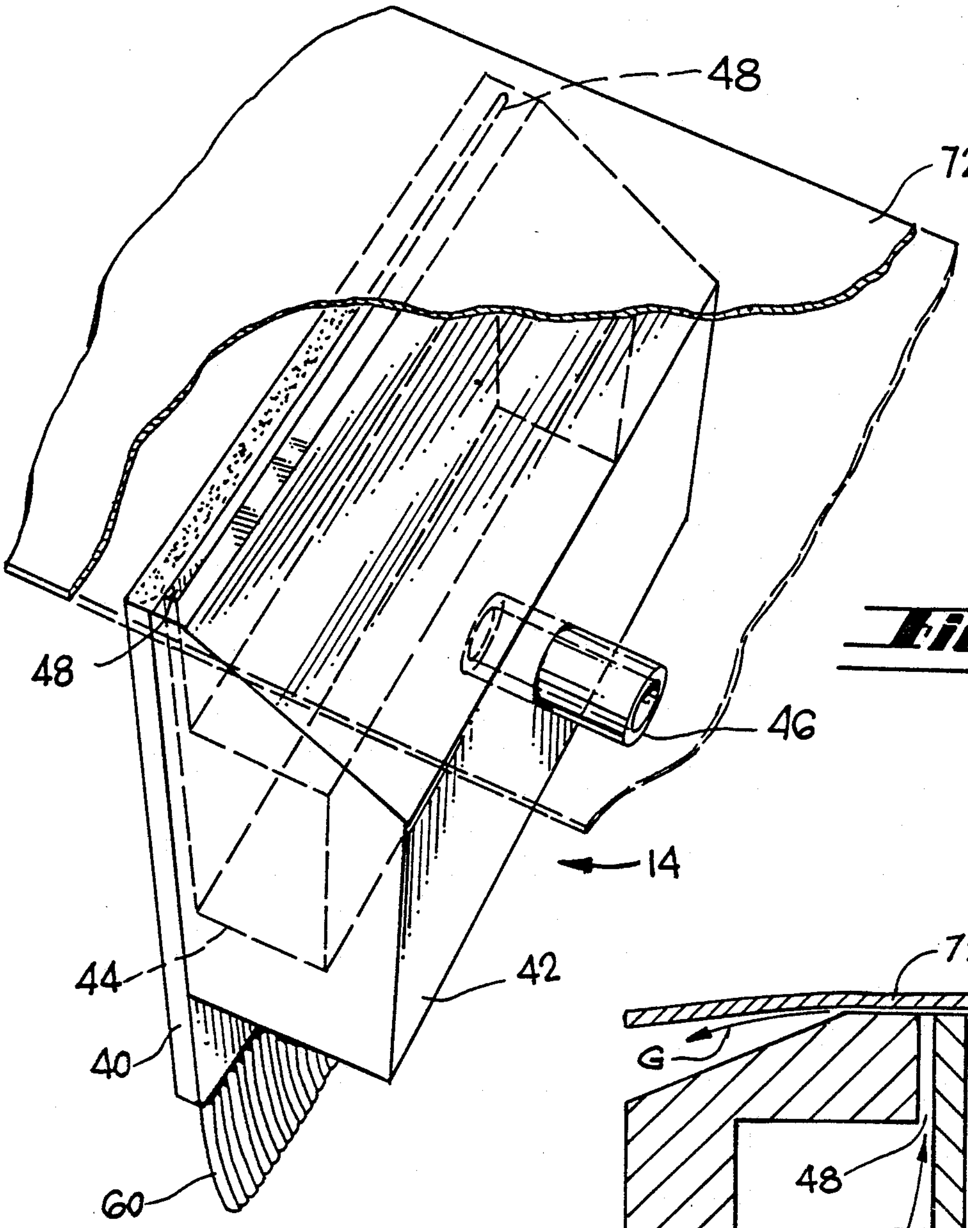
FIG. 6 is a perspective view of the writing head of the present invention shown adjacent to a passing web of paper.
Figure 7:
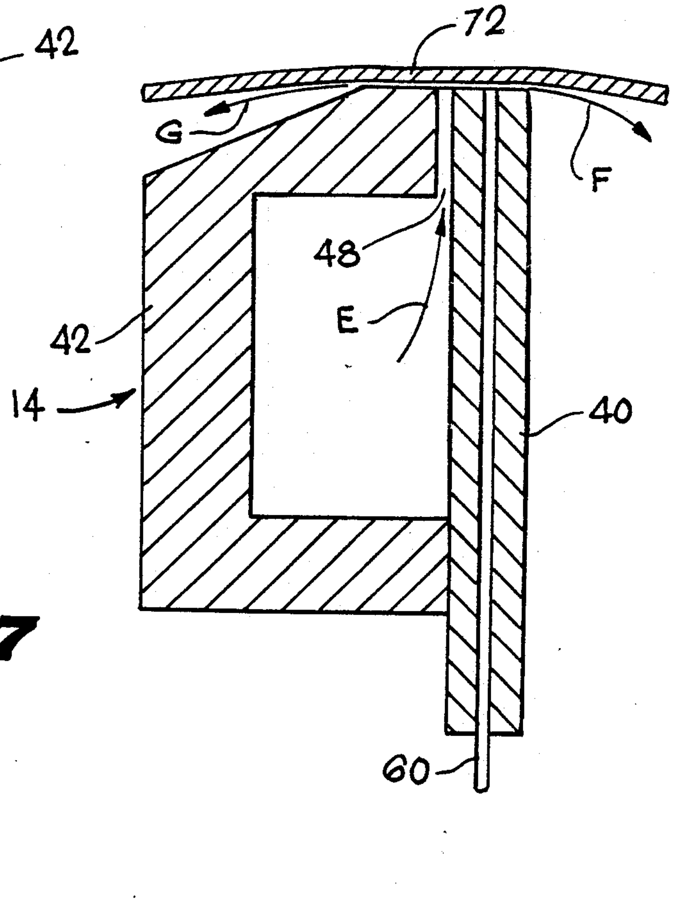
FIG. 7 is a side sectional view of the writing head of FIG. 6.

Referring now to FIGS. 6 and 7, the writing head 14 is shown adjacent paper 72 that is unsupported by a drum. Instead, the paper is drawn from a web and a number of guides, not shown, define a path for paper travel. Where the image carrier is paper from a web, typically the paper is partially wrapped around the writing head 14. A small degree of wrap is shown in FIG. 7, but because the illustrated writing head has sharp edges both on the retainer member 40 and the air chamber member 42, the wrap must be minimized to prevent damage to the paper. Because the contacting surfaces of the writing head are flat, a resilient backing member behind the paper 72, such as a soft roller or a pad, may be used to urge the paper into contact with the writing head. Alternatively, the upper surfaces of the retainer member 40 and the air chamber member 42 may be smoothly curved as in the case of a magnetic tape write/read head, so that damage is prevented.

In contrast to description above, the writing head 14 of FIGS. 6 and 7 is locked in position. Thus, as gas is projected from inlet 46 into the plenum 44 and through the gas-release opening 48, the writing head is unable to move into an equilibrium position. Rather, the pressurized gas from the opening 48, as indicated by arrow E, urges the paper 72 away from the writing head 14. The gas escapes between the paper and the surface of the retainer member 40, as indicated by arrow F, and escapes between the paper and the surface of the air chamber member 42, as indicated by arrow G, thereby spacing the paper away from the writing head. Adjustment of the gas pressure determines the equilibrium position of the paper.

While the paper 72 is shown in spaced relation to the writing head 14, this is not critical. The escape of gas from the plenum 44 and gas-release opening 48 may serve to reduce the mechanical pressure of the paper 72 against the writing head 14, with maintenance of nominal contact between the two. In such case, leakage of air occurs due to the microscopic roughness of the two mating surfaces.

By removing the writing end of a head 14 from physical contact with the image carrier, the risk of head damage and media damage resulting from movement of one relative to the other is significantly reduced, if not eliminated. Moreover, there are reasons to believe that increasing air pressure between the nibs and the sheet of paper increases image quality. The nibs may be located at either the forward or the rearward side of the gas-release opening 48, relative to paper movement. It is believed that an increase in air pressure shortens the gas discharge initiation time, thereby increasing image quality. At least theoretically, such "high pressure" writing requires smoother imaging surfaces and produces higher quality in terms of charge uniformity. While the present invention has been described with reference to an electrostatic printer employing a drum system, the air bearing writing head may also be employed in other applications in which it is beneficial to space a head from a medium.

While reference is made to the patent by Bibl et al. in describing the invention, this is only exemplary, and the invention is applicable to a broad range of copiers and printers. At least theoretically, there is no limit to the length of the writing head 14. There are, however, practical considerations since the mechanical tolerances of drum 16 manufacturing become a greater concern as the writing head is extended in length. With an imaging system employing a continuous web, the writing head may be full-width.

I claim:

1. An apparatus for forming an electrographic latent image on an image carrier, comprising, an electrographic writing head having a plurality of charging elements disposed to provide localized electrical charge on said image carrier, one of said writing head and said image carrier resiliently biased with respect to the other to provide a forward bias to the extent that said writing head and image carrier are biased into a mutually contacting condition, and means coupled to said writing head for projecting pressurized gas at said image carrier to provide a force causing a back bias between said writing head and said image carrier in a direction to relieve contact pressure between said writing head and said image carrier.

2. The apparatus of claim 1 further comprising force means for resiliently biasing said writing head into a rest position in which said writing head is in said contact under pressure with said image carrier, said image carrier remaining in nominal contact with said writing head in said equilibrium position.

3. The apparatus of claim 1 wherein said writing head has an outlet side adjacent said image carrier, said means for projecting pressurized gas including a gas-release opening at said outlet side, gas flow from said gas-release opening escaping between said image carrier and said outlet side.

4. The apparatus of claim 3 wherein said outlet side includes a first external surface and a second external surface spaced apart from the first external surface to define said gas-release opening therebetween.

5. The apparatus of claim 1 wherein said image carrier is a sheet of paper supported on a rotatable drum having an axis of rotation, and wherein said gas-release opening extends from the direction parallel to the axis of rotation of said drum.

6. The apparatus of claim 1 wherein said equilibrium position spaces apart said writing head from said image carrier by a distance of up to 20 microns.

7. The apparatus of claim 1 wherein said projection of gas is directed to increase air pressure at said charging elements to affect formation of said localized electrical charge.

8. An apparatus for forming a latent image on an image carrier comprising, means for supporting an image carrier, an electrographic writing head disposed adjacent to said image carrier, biasing means operatively associated with one of said supporting means and said writing head for resiliently biasing said image carrier and said writing head into mutually contacting rest positions;

writing means coupled to said writing head for selectively forming an electrographic latent image on said image carrier, and means coupled to said writing head for providing a flow of gas at said image carrier, said flow of gas resulting in a force opposing said biasing means to the extent that an equilibrium condition is reached in which one of said image carrier and said writing head is in spaced relation to the respective rest position.

9. The apparatus of claim 8 wherein said writing head and said image carrier are in nominal contact when said equilibrium condition is reached.

10. The apparatus of claim 8 wherein said means for supporting an image carrier is a drum.

11. The apparatus of claim 10 wherein said flow of gas spaces apart said writing head from said image carrier by a distance is in the range of 0.5 micron and 20 microns.

12. The apparatus of claim 8 wherein said image carrier is a sheet of paper.

13. The apparatus of claim 8 wherein said writing head has an internal plenum and has an outlet side adjacent said image carrier, said means for providing the flow of gas including at least one opening leading from said internal plenum to said outlet side, said back bias being created by the escape of gas between said outlet side and said image carrier.

14. The apparatus of claim 13 wherein said outlet side includes first and second bearing surfaces spaced apart to define said opening.

15. The apparatus of claim 8 wherein a portion of said flow of gas passes between said writing means and said image carrier during said formation of said electrographic latent image.

16. An apparatus for an electrographic reproduction machine of the type having a charge-retentive image carrier supported on a rotatably driven drum, comprising, an elongated head having an outlet side with a plenum opening defined therein, said outlet side disposed to contact a charge-retentive image carrier supported on said rotatably driven drum, said head having a plenum joined to the ambient atmosphere at said plenum opening and further having a plurality of charging elements disposed to provide localized charges on said image carrier, force means for biasing said head into a rest position in contact with said image carrier in a manner to block said plenum opening, and means for providing a pressurized gas to said plenum of the head for projection from said plenum opening, thereby overcoming said force means until an equilibrium position is reached wherein said head is back biased away from said image carrier relative to said rest position.

17. The apparatus of claim 16 wherein said equilibrium position is spaced apart from said rest position by a distance of up to 20 microns.

18. The apparatus of claim 16 said plenum opening extends to said plenum in a direction coincident with the direction of a radius of said drum.

19. The apparatus of claim 16 wherein said outlet side of the head has first and second bearing surfaces spaced apart to define said plenum opening.

20. The apparatus of claim 19 wherein said first and second bearing surfaces are planar.

21. The apparatus of claim 20 wherein said force means presses said first and second bearing surfaces toward contact with said image carrier, and wherein said projection of pressurized gas escapes between said image carrier and said first and second bearing surfaces to provide a counterforce preventing said contact.

22. A method of writing an electrostatic image on an image carrier comprising, resiliently biasing one of an electrographic writing head and an image carrier into contact with the other, directing a flow of gas from said writing head to impinge said image carrier so as to produce a force opposing said resiliently biasing to the extent that said one of a writing head and image carrier is moved to a desired equilibrium position relative to the other, providing relative motion between said writing head and said image carrier for the formation of a latent image on said image carrier, and energizing charging elements of said writing head to produce a pattern of localized charges, said pattern forming said latent image.

23. the method of claim 22 wherein said impinging flow of gas has a force to space apart said writing head from said image carrier by a distance of up to twenty microns.

24. The method of claim 22 wherein said relative motion for the formation of a latent image is provided by guiding a charge-retentive sheet of paper past a stationary writing head.

25. The method of claim 22 further comprising supporting said image carrier on a drum, said relative motion being provided by rotation of said drum.

26. The method of claim 22 wherein said directing of a flow of gas is in a fashion to raise the air pressure at an area adjacent said charging elements, so as to affect said production of said pattern of localized charges.

* * * * *